United States Patent [19]

Stimson et al.

[11] 3,934,686

[45] Jan. 27, 1976

[54] CARBON FRICTION MEMBERS HAVING TORQUE TRANSMITTING FORMATIONS

[75] Inventors: Ian Leonard Stimson, Rugby; Frederick Sidney Dowell, Coventry, both of England

[73] Assignee: Dunlop Limited, London, England

[22] Filed: Dec. 18, 1973

[21] Appl. No.: 425,801

[30] Foreign Application Priority Data
Dec. 20, 1972   United Kingdom............... 58890/72

[52] U.S. Cl.... 188/251 A; 188/218 XL; 192/107 M
[51] Int. Cl.² ......................................... F16D 69/02
[58] Field of Search ........ 188/251 A, 218 XL, 73.2; 192/107 R, 107 M

[56] References Cited
UNITED STATES PATENTS

| | | | |
|---|---|---|---|
| 3,552,533 | 1/1971 | Nitz | 188/251 A |
| 3,639,197 | 2/1972 | Spain | 188/251 A |
| 3,712,428 | 1/1973 | Marin | 188/251 A |
| 3,731,769 | 5/1973 | Ely | 188/251 A |
| 3,738,457 | 6/1973 | Dowell | 188/73.2 |

FOREIGN PATENTS OR APPLICATIONS

| | | | |
|---|---|---|---|
| 1,134,959 | 4/1957 | France | 188/218 XL |
| 2,006,540 | 8/1971 | Germany | 188/251 A |

*Primary Examiner*—George E. A. Halvosa
*Assistant Examiner*—Edward R. Kazenske
*Attorney, Agent, or Firm*—Stevens, Davis, Miller & Mosher

[57] ABSTRACT

A carbon brake disc has its torque transmitting formations (keyways or keys) reinforced by filament reinforced carbon inserts which are preferably located, and may be bonded, in cut-out areas of the disc periphery. The formations are formed by a separate series of operations from those used to form the remainder of the friction members such as by application of a filimentary reinforcement of carbonized cloth, textile tape, random textile fibers or boron fibers.

10 Claims, 17 Drawing Figures

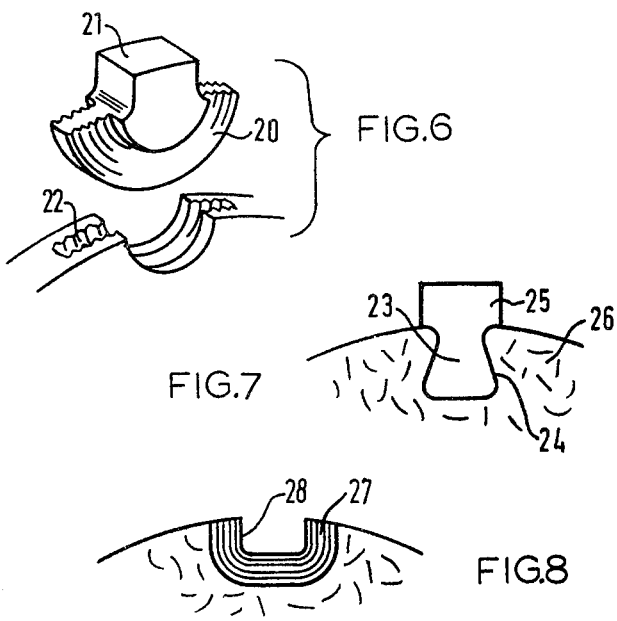
FIG. 6
FIG. 7
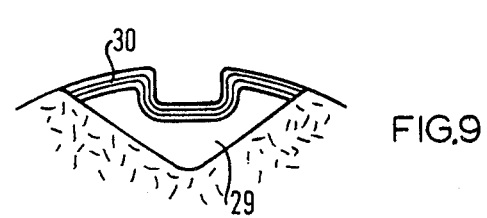
FIG. 8
FIG. 9
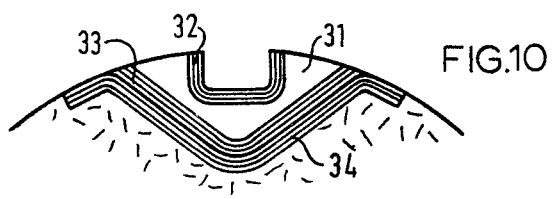
FIG. 10

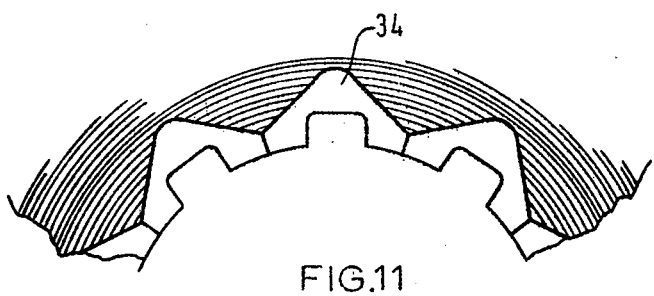
FIG.11
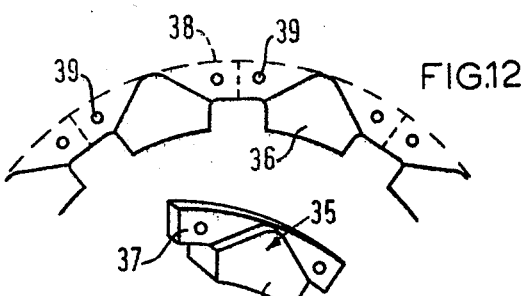
FIG.12
FIG.13
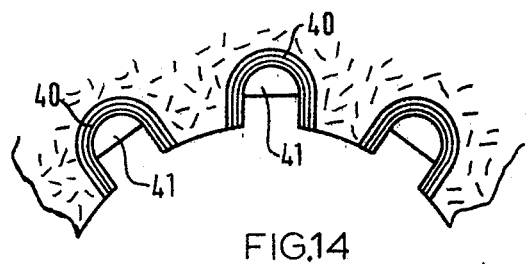
FIG.14

CARBON FRICTION MEMBERS HAVING TORQUE TRANSMITTING FORMATIONS

This invention relates to carbon friction members for brakes and clutches, and particularly, though not exclusively, to such friction members for use in aircraft.

In the aircraft disc brake field the use of friction members constructed from carbon is already well established. Such friction members may comprise, for example, an annular disc provided on its inner or outer periphery with torque-transmitting formations. If desired this basic disc may be provided with separate friction pads on one or both sides.

Although carbon is a particularly attractive material for use as an aircraft disc brake friction member on account of its good frictional properties and high specific heat, the relatively weak structural properties of carbon cause problems in transmitting the concentrated loads imposed on the torque-transmitting formations of aircraft friction members.

It is an object of the present invention to provide an improved form of carbon friction member for use in a brake or clutch.

According to one aspect of the present invention a carbon friction member for a brake or clutch comprises an annular carbon disc, one periphery of which is provided with a number of circumferentially-spaced torque-transmitting formations being formed reinforced by filamentary material, the formations being formed by a separate sequence of operations from those used to form the remainder of the friction member.

The filamentary reinforcement of the torque transmitting formations may, for example, take the form of carbonized cloth, textile tape or random textile fibers or alternatively may comprise any other suitable filamentary material such as, for example, boron fibers.

The torque-transmitting formations may, for example, take the form of inserts incorporating keyways and positioned in cut-outs provided in one of the peripheries of the discs or alternatively the formations may comprise keys which are secured to and project from one of the peripheries of the disc.

References throughout this specificiations to "carbon" should be understood to include all suitable forms of carbon including graphite.

Several embodiments of the present invention, as applied to friction members for use in a multi-plate aircraft disc brake, wil now be described with reference to FIGS. 1 to 17 of the accompanying drawings.

A multi-plate aircraft disc brake (not shown) conventionally comprises a number of non-rotatable friction members or stator discs keyed at their inner peripheries to a torque tube and interleaved between a number of rotatable friction members or rotor discs keyed at their out peripheries to an associated aircraft wheel. The rotor and stator discs are arranged to be axially displaced, and hence brought into frictional engagement, by a hydraulic brake applying mechanism.

FIGS. 1–3, 5 and 6 are partial perspective views of the outer periphery of a disc showing various means of reinforcing a keyway thereon;

FIGS. 4 and 7–10 are elevational views of a portion of the outer periphery of a disc showing other means of reinforcement;

FIGS. 11, 12 and 14 are elevational views of the inner peripheries of an annular disc showing various reinforcement inserts;

FIG. 3 is a perspective view of one of the inserts of FIG. 12;

Figure 1:
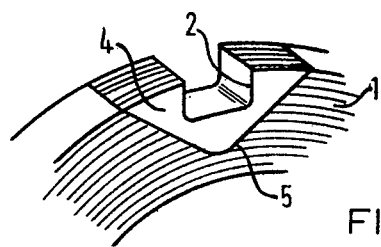

FIG. 1 of the accompanying drawings shows part of the outer periphery of a rotor disc 1, suitable for use in an aircraft multi-plate disc brake, provided with a number of circumferentially-spaced keyways 2 which co-operate with corresponding keys (not shown) provided on an associated aircraft wheel structure. Each keyway is formed in a torque-transmitting insert 4 which is bonded into a cut-out 5 provided in the outer periphery of the rotor disc.

In the construction shown in FIG. 1 the disc is formed from material comprising a matrix of carbon and a filamentary reinforcement in the form of a carbonized circumferential winding of tape, while the torque-transmitting inserts are formed from a material comprising a matrix of carbon and a filamentary reinforcement in the form of carbonized laminations of cloth. Alternatively, the disc may be reinforced by a carbonized felt.

The various disc and torque-transmitting formations described in this specification can be produced either by the well-known vapor deposition technique in which the filamentary reinforcement is first bonded and subsequently densified by passing through it, under suitably controlled conditions, a carbon bearing gas, or alternatively by the well-known liquid impregnation technique in which the reinforcement is impregnated with resin or pitch which is then carbonized under suitably controlled conditions.

The density of the components can be raised to the desired level by repeating the gaseous deposition or liquid impregnation processes the requisite number of times.

If desired, a combination of the vapor deposition and liquid impregnation techniques can be employed.

The torque-transmitting formations and disc may be initially separately formed and then bonded together when both the torque-transmitting formations and disc are in their finally densified condition, but better results are normally achieved when one or both mating components is or are only partially densified. Furthermore, the joint is generally more satisfactory when the components are bonded together by the vapour deposition technique.

If desired the torque-transmitting formations can be built-up in situ on a separately formed disc in which the reinforcement is already carbonized and partially or finally densified. Alternatively the torque-transmitting formations can be separately formed, carbonized and partially or finally densified and the disc can then be built up around the formations.

In constructions in which the torque-transmitting formations comprise inserts mounted in cut-outs provided in a periphery of the disc, no actual bond may be required between the inserts and the disc if the inserts are suitably shaped and are a sufficiently tight fit in the cut-outs.

Although in all the constructions described in this specification both the torque-transmitting formations and discs contain some degree of filamentary reinforcement it is possible, if the intended operating conditions of the disc are suitable, that the discs themselves need not be reinforced. Further, although throughout this specification reference is made to the various types of reinforcement used in the constructions described, it will be understood by those skilled in the art, that the various types of carbonized reinforcement available such as cloth, felt, tape and ordinary filaments are to some degree interchangeable and that where a particular type of reinforcement is described as being suitable other types may also be used.

Figure 2:
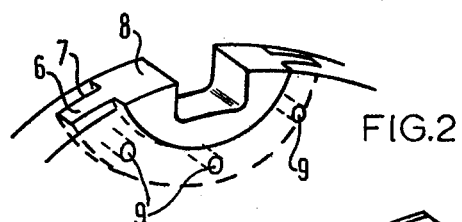

When the torque-transmitting formations take the form of inserts, as shown in FIG. 1, the precise shape of the joints between the torque-transmitting inserts and the disc is not critical providing the use of small radii or other shapes which result in stress concentrations are avoided. For example, the construction shown in FIG. 1 can be modified, as shown in FIG. 2, by making the inserts 8 substantially semi-circular in shape and providing a tongue 6 on each insert which co-operates with a corresponding groove 7 in the cut-out in the outer periphery of the disc to form a tongue and groove joint between each insert and the disc. The provision of this tongue and groove joint between each insert and the disc increases the surface area of contact between the inserts and the disc and hence the strength of the joints between these components. If desired the bond between the inserts and the disc can be further strengthened by the use of pins 9 again formed from a material comprising a carbon matrix and a filamentary carbon reinforcement extending from the tongue of the insert into holes formed in disc.

Figure 3:
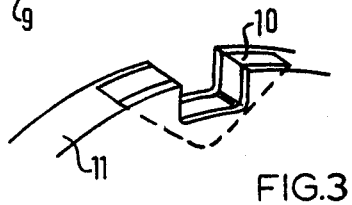

A still further modification of the construction shown in FIG. 1 is shown in FIG. 3. In this further modification the inserts 10, which are cloth reinforced with cloth, textile tape, random textile fibers or boron fibers, are fully recessed into the disc so that the disc surrounds the inserts on all but their radially outer faces. This again increases the area of contact between the inserts and the disc and allows the disc itself to be reinforced with a structurally weaker material such as random fibers.

Figure 4:
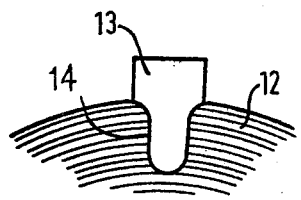

The arrangement shown in FIG. 4 shows part of a disc brake rotor 12, formed with a tape wound reinforcement as shown in FIG. 1, which is keyed to the associated wheel structure by a number of circumferentially-spaced keys 13. The keys are reinforced by laminations of carbonized cloth, as described above with reference to FIG. 1, and are received in cut-outs 14 provided in the outer periphery of the disc. As an alternative to cloth the keys may be reinforced by substantially radially extending filaments of carbon. Again the desirability of avoiding small radii and other configurations which will promote stress concentrations is the deciding factor in determining the shape of the keys 13.

Figure 5:
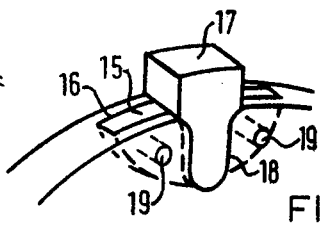

The construction shown in FIG. 4 can be strengthened, as shown in FIG. 5, by providing on each insert 17 a tongue 15 which co-operates with a corresponding groove 16 provided in the cut-out 18 which receives the insert. The use of this tongue and groove joints increases the area of contact between the inserts and the disc, as described with relation to FIG. 2, and thus increase the strength of the joint between these components and reduces the tendency of the disc to fracture as a result of the keys tending to lever open the cut-outs under load. The construction shown in FIG. 5 can be further strengthened by the use of pins 19, which may be reinforced by filamentary carbon and which extend through the disc and the tongue.

A modification of the construction shown in FIG. 5 is shown in FIG. 6. In this modification the tongue 20 formed on each insert 21 and the groove 22 provided in each cut-out in the disc are serrated to further increase the surface area of contact between the inserts and the disc to provide a strong locking action between these components.

FIG. 7 of the accompanying drawings shows a further modification of the construction shown in FIG. 4. In this modification the portion of each insert 23 which is received in the cut-out 24 in the disc is dove-tail shaped and the portion of the insert which projects beyond the outer periphery of the disc is shaped to provide two flanges 25 which abut the outer periphery of the disc 26. As a result of the abutting contact between flanges 25 and the outer periphery of the disc the insert is provided with a greater degree of support within the cut-out and is less liable to tend to lever the cut-out apart under load. This means that a disc material with a lower hoop strength (i.e. strength in a circumferential direction) can be utilized such as, for example, a random fiber or cloth reinforcement material.

FIGS. 8, 9 and 10 of the accompanying drawings show three further ways in which a torque-transmitting insert incorporating a keyway and reinforced by filamentary carbon can be accommodated in a cut-out formed in the outer periphery of a rotor disc.

In the construction shown in FIG. 8 the insert 27 takes the form of a number of layers of carbonized tape which extend substantially parallel to the sides and base of the keyway 28. This construction is advantageous as the tape layers are strongest in tension and the principal stresses occur in planes substantially parallel to the sides and base of the keyway, thus by arranging the tapes substantially parallel to the sides and base of the keyway the tapes are stressed mainly in tension.

The construction shown in FIG. 9 is a combination of the constructions shown in FIGS. 1 and 8 and comprises a laminated cloth insert 29 in which the edges of the keyway are reinforced by several layers of tape 30. By turning the ends of each of the tapes in a direction substantially parallel to the outer periphery of the disc the edges of the cloth laminations and tapes of the insert are not exposed on the outer periphery of the disc and the dangers of oxidation and delamination are thus reduced. The use of the larger insert also increases the area of contact between the insert and disc thus increasing the strength of the joint between these two components.

The construction shown in FIG. 10 shows a further alternative form of insert comprising cloth laminations 31 in which the edges of the keyways are reinforced by several layers of tape 32 and the edge of each insert which is bonded to the disc is also reinforced by several layers of tape 33. The mating faces of the disc are similarly reinforced by several layers of tape 34. The reinforcement of the mating portions of the inserts and disc with similar tape material matches the physical properties of the disc and inserts thus avoiding the difficulties associated with joining dissimilar materials.

Stator discs, suitable for use in aircraft multiplate disc brakes, can also be provided with torque-transmitting inserts in a similar manner to the rotor constructions described above.

FIG. 11 shows part of the inner periphery of a stator disc provided with torque-transmitting inserts which are reinforced by laminations of carbonized cloth and are substantially identical to those previously described with reference to FIG. 1. Because of the closer spacing of stator keyways the inserts abut each other and, under load, the ring of inserts is loaded in compression so that the inserts provide some degree of support for each other and thus relieve some of the loading from the joints between the inserts and the disc. The construction shown in FIG. 11 requires the disc material to have a reasonable tensile hoop strength and thus a tape wound disc construction is particularly suitable.

The construction shown in FIGS. 12 and 13 is the stator equivalent of the construction shown in FIG. 5. Each insert 35, which is of a laminated cloth construction, is provided with a key 36 and a tongue 37 which engages a corresponding groove 38 provided in the inner periphery of the disc. The inserts, which again abut each other, may, if desired, be pinned to the disc by pins 39 which may be reinforced with filamentary carbon.

FIG. 14 shows a further form of stator construction in which the inserts comprise a number of U-shaped layers of tape 40 which define the sides of the keyways and semicircular cloth reinforced fillets 41 which are bonded into the bottoms of the U-shaped tape layers and which define the bases of the keyways.

In the various constructions described above the torque-transmitting formations comprise inserts which are mounted in cut-outs provided in one of the peripheries of the brake disc. Those skilled in the art will realize that the torque-transmitting formations can take other forms such as for example the arrangements shown in FIGS. 15 and 16 in which a number of carbon keys 42, reinforced with filamentary material, are bonded to the outer periphery of a random fibre reinforced carbon rotor disc 43.

Figure 15:
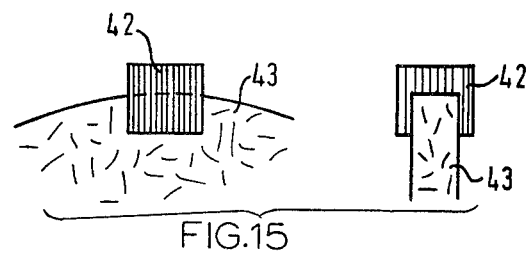
FIGS. 15–17 are elevational views showing channel-shaped key on the outer periphery of a disc.

In the arrangement shown in FIG. 15 the keys are each channel-shaped so as to extend across the outer periphery of the disc and contact the sides of the disc in the vicinity of the outer periphery. The keys are reinforced by cloth laminations which extend in substantially radially aligned planes at right angles to the plane of the disc.

Figure 16:
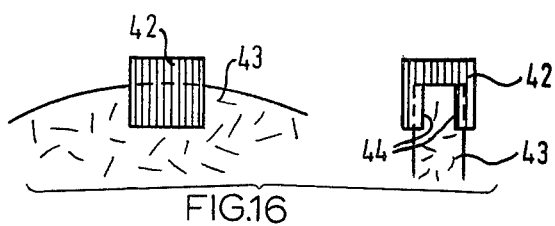

In the arrangement shown in FIG. 16 the bond between the keys and disc is strengthened by setting the keys 42 into recesses 44 provided in the sides of the disc.

Figure 17:
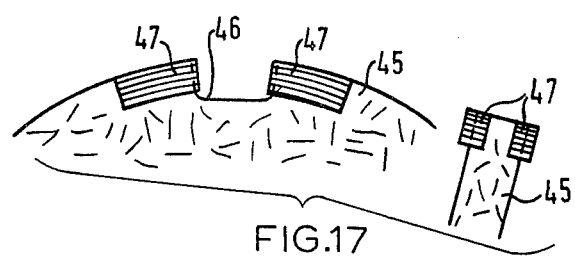

FIG. 17 shows a further form of torque-transmitting formation in which a random fiber reinforced carbon rotor disc 45 is rotated with a number of circumferentially spaced keyways 46 the sides of which are each reinforced with two carbon blocks 47 partially recessed into the disc. The carbon blocks, which provide the abutment surface for contact with the keys provided on the associated wheel, are reinforced with cloth laminations which extend in substantially circumferentially aligned planes at right angles to the plane of the disc.

Although in the rotor and stator constructions described above the torque-transmitting formations have been described as being reinforced by various forms of filamentary carbon, other forms of filamentary reinforcement, such as boron fibers, are also suitable. These fibers may conventionally be formed by depositing boron from a boron containing gas onto filaments of a high melting point metal such as tungsten.

It will also be understood by those skilled in the art that, although the various rotor and stator constructions described above do not employ separate friction pads secured to one or both faces of the disc, separate friction pads can be utilized if desired.

The rotor and stator constructions described above with reference to FIGS. 1 to 14 also possess the advantage that the torque-transmitting inserts can, if desired, form part of the friction surfaces of the discs.

All the friction member constructions described above include simple and yet efficient torque-transmitting formations capable of taking the concentrated loads imposed in an aircraft disc brake. This enables friction members to be produced in which the special qualities desired in the vicinity of the torque-transmitting formations can be readily incorporated without any substantial complication, and hence increased cost, in the construction of the remainder of the friction member.

Having now described our invention, what we claim is:

1. A carbon frictional member for a brake or clutch comprising an annular carbon disc one periphery of which is provided with a number of discrete circumferentially-separated carbon torque-transmitting formations reinforced by filamentary material, the formations being formed by a separate sequence of operations from those used to form the remainder of the friction member and recessed into the periphery so that the disc surrounds the inserts on all but their radially outer faces.

2. A member as claimed in claim 1, wherein the filamentary reinforcement of the torque-transmitting formations takes the form of carbonized cloth.

3. A member as claimed in claim 1, wherein the filamentary reinforcement of the torque-transmitting formations takes the form of carbonized textile tape.

4. A member as claimed in claim 1, wherein the filamentary reinforcement of the torque-transmitting formations takes the form of carbonized random textile fibers.

5. A member as claimed in claim 1, wherein the filamentary reinforcement of the torque-transmitting formations takes the form of carbonized boron fibers.

6. A member as claimed in claim 1 wherein the disc is formed from material comprising a matrix of carbon and a filamentary reinforcement in the form of carbonized felt.

7. A member as claimed in claim 6 wherein each torque-transmitting formation takes the form of an insert positioned in and substantially filling a respective cut-out provided in one of the peripheries of the disc.

8. A member as claimed in claim 7 wherein each cut-out and the associated insert are in mutual contact at surfaces comprising large radius curves.

9. A member as claimed in claim 8 wherein a tongue-and-groove joint is formed between each insert and the associated cut-out of the disc.

10. A member as claimed in claim 1 wherein the disc is formed from material comprising a matrix of carbon and a filamentary reinforcement in the form of a circumferential winding of textile tape.

* * * * *